United States Patent [19]
Gallucci et al.

[11] Patent Number: 5,371,123
[45] Date of Patent: Dec. 6, 1994

[54] GLASS FILLED FLAME RETARDANT POLYESTER COMPOSITIONS WITH IMPROVED COLOR

[75] Inventors: Robert R. Gallucci, Mt. Vernon; Leslie J. Goff, Evansville; Douglas G. Hamilton, Mt. Vernon, all of Ind.

[73] Assignee: General Electric Company, Mass.

[21] Appl. No.: 994,759

[22] Filed: Dec. 22, 1992

[51] Int. Cl.$^5$ .................. C08K 5/3417; C08K 5/15; C08K 3/40

[52] U.S. Cl. .................... 524/94; 524/109; 524/412; 524/494; 524/539

[58] Field of Search .............. 524/94, 109, 412, 495, 524/539

[56] References Cited

U.S. PATENT DOCUMENTS

| | | | |
|---|---|---|---|
| 2,465,319 | 3/1949 | Whinfeld et al. | 260/75 |
| 3,047,539 | 7/1962 | Pengilly | 260/75 |
| 3,368,995 | 2/1968 | Furukawa et al. | 260/40 |
| 3,624,024 | 11/1971 | Caldwell et al. | 260/40 |
| 3,671,487 | 6/1972 | Abolins | 260/40 |
| 3,837,898 | 9/1974 | McCombs et al. | 117/72 |
| 3,962,174 | 6/1976 | Berardinelli | 260/40 |
| 4,124,561 | 11/1978 | Phipps, Jr. et al. | 260/40 |
| 4,276,208 | 6/1981 | Ogawo et al. | 524/109 |
| 4,358,501 | 11/1982 | Temple | 428/268 |
| 4,374,220 | 2/1983 | Sonnenberg | 524/94 |
| 4,394,475 | 7/1983 | Temple et al. | 524/262 |
| 4,451,592 | 5/1984 | Black et al. | 523/206 |
| 4,487,797 | 12/1984 | Watson | 428/268 |
| 4,518,653 | 5/1985 | McWilliams et al. | 428/378 |
| 4,532,290 | 6/1985 | Jacquiss et al. | 524/417 |
| 4,539,350 | 9/1985 | Abeelen et al. | 524/267 |
| 4,552,911 | 11/1985 | Cohnen et al. | 524/94 |
| 4,568,712 | 2/1986 | Van Abeelen et al. | 524/267 |
| 4,629,750 | 12/1986 | Hepp | 523/201 |
| 4,632,949 | 12/1986 | Krishnan | 524/94 |
| 4,684,686 | 8/1987 | Hepp | 524/281 |
| 4,711,924 | 12/1987 | Salensky | 524/402 |
| 4,745,028 | 5/1988 | Das et al. | 428/391 |
| 4,981,754 | 1/1991 | Hsu | 428/288 |
| 4,990,549 | 2/1991 | Delvin et al. | 523/209 |

FOREIGN PATENT DOCUMENTS

| | | |
|---|---|---|
| 0400936 | 12/1990 | European Pat. Off. |
| 1592205 | 7/1981 | United Kingdom |
| 1592668 | 7/1981 | United Kingdom |

*Primary Examiner*—Kriellion S. Morgan

[57] ABSTRACT

Polyester resins, optionally in combination with a polycarbonate, flame retarded with a halogenated bis-imide flame retardant agent and modified with a glass fiber reinforcing agent treated with a coating agent selected from certain polyepoxides and/or polyolefins exhibit markedly improved color characteristics.

27 Claims, No Drawings

GLASS FILLED FLAME RETARDANT POLYESTER COMPOSITIONS WITH IMPROVED COLOR

The present invention relates to flame retardant polyester resins modified with a glass fiber reinforcing agent. More particularly, it relates flame retardant polyester resins modified with a glass fiber reinforcing agent coated with a polyepoxide or polyolefin coating agent having improved color.

BACKGROUND OF THE INVENTION

High molecular weight linear polyesters and copolyesters of glycols and terephthalic or isophthalic acid have been available for a number of years. These are described inter alia in Whinfield et al., U.S. Pat. No. 2,465,319 and in Pengilly, U.S. Pat. No. 3,047,539. These patents disclose that the polyesters are particularly advantageous as film and fiber formers.

Such polyesters have not been widely accepted for use as molding resins, however, until only fairly recently, because of their relative brittleness in thick sections when crystallized from the melt. This problem was overcome by varying the crystal texture, e.g., by using two-step molding cycles or including nucleating agents, and by molecular weight control. This permitted the marketing of injection moldable poly(ethylene terephthalates) which typically, in comparison with other thermoplastics, offered a high degree of surface hardness and abrasion resistance, and lower surface friction.

Simultaneously with the development of injection molding grades of polyester resins, fiber glass reinforced compositions were also provided. See, Furukawa et al., U.S. Pat. No. 3,368,995 and Zimmerman et al., U.S. Pat. No. 3,814,725. These injection moldable compositions provided all of the advantages of unfilled polyesters and, also, because of the glass reinforcement had higher rigidity, yield strength, modulus and impact strength.

Pristine, or sizing free, glass fibers have been disclosed as reinforcing agents in Abeleen et al., U.S. Pat. No. 4,539,350 and Abeleen et al., U.S. Pat. No. 4,568,712. These two patents teach the addition of a polysiloxane compound to improve the ductility of the polyester resins.

Conventional starch based sizings have been disclosed in the prior art. Abolins, in U.S. Pat. No. 3,671,487, teaches the use of lightly sized or unsized glass fibers in preparing flame and drip retardant glass reinforced polyester resins. Wambach, in U.S. Pat. No. 4,113,692, employs conventional sized glass fibers and polycarbonate resins to increase resistance to warpage in poly(1,4-butylene terephthalate) and poly(ethylene terephthalate) resin blends. Similarly, warp resistant polyesters with glass filaments in combination with talc or mica fillers are disclosed in United Kingdom Patent Nos. 1,592,205 and 1,592,668, but sizings are conventional and are either optional or lightly employed.

Non-starch aqueous sizings for treating glass fibers are disclosed in Temple et al., U.S. Pat. No. 4,394,475. The patentee therein teaches a sizing composition comprising a non-starch film forming polymer, a polyethylene containing polymer and a wax which improves the slip/flow characteristics of the glass fibers.

Epoxy coated glass fibers to reinforce polymer materials are disclosed in Watson, U.S. Pat. No. 4,487,797 and Das et al., U.S. Pat. No. 4,745,028. Watson teaches an aqueous chemical composition comprising a water dispersible, emulsifiable or soluble epoxy novolac film forming polymer in combination with a glass fiber coupling agent and a poly(oxyalkylene-oxyethylene)polyol copolymer as the sizing agent. Das et al., teach a sizing composition which comprises an aqueous epoxy polyurethane with blocked isocyanate crosslinking groups and at least one or more organo coupling agents. Ogawa et al., U.S. Pat. No. 4,276,208 describe polyester resin compositions having glass fibers surface coated with an epoxy compound having at least two epoxy groups in the molecules such as bisphenol-A type epoxy compound, bisphenol-F type epoxy compound and novolac type epoxy compound, in combination with a salt of a montan wax.

It is further known to flame retard the polyester composition with a variety of flame retardant agents, including halogenated organic compounds and phosphorus compounds. However, it has recently been discovered that when halogenated bis-imide flame retardants are employed as the flame retardant agent in glass filled polyesters, there results a discoloration in the final polyester resin.

There is no teaching or suggestion in the prior art which contemplates the use of a certain epoxylated compounds or polyolefins as glass fiber coating agents to impart improved color on polyester resins which are flame retarded with a halogenated bis-imide. Unexpectedly, it has now been found that thermoplastic resin compositions comprising a polyester resin, a halogenated bis-imide flame retardant and a glass fiber reinforcing agent coated with a coating agent comprising epoxylyated phenolics, epoxylated carboxylic acids, polymers of unsaturated epoxides, epoxylated dienes or polyenes; or polyolefins suprisingly exhibit a marked improvement in color over flame retarded polyester resin compositions containing glass fibers coated with other coating agents of the prior art such as polyurethane. Further, the coated glass fibers of the present invention have excellent strand integrity making them especially suitable for use in the preparation of molding compositions.

Special mention is made of Delvin et al., U.S. Pat. No. 4,990,549 which teaches that polyesters flame retarded with any of the conventional flame retardant agents can be modified with a glass fiber reinforcing agent treated with a sizing agent comprising a di- or tri-functional cyanurate or isocyanurate to provide improved physical properties on the polyester resin. However, the sizing agents disclosed in Delvin et al. provide glass fibers with poor strand integrity and are only difficultly compounded into moldable compositions.

SUMMARY OF THE INVENTION

According to the present invention there is provided a thermoplastic resin composition comprising: (a) a polyester resin; (b) a halogenated bis-imide flame retardant; and (c) a glass fiber reinforcing agent coated with a coating agent selected from epoxylated phenolics, epoxylated carboxylic acids, epoxy novolacs, polymers of unsaturated epoxides, epoxylated dienes or polyenes, or mixtures thereof. Alternatively, the coating agent may comprise a polyolefin.

In preferred embodiments, the polyester resin comprises a poly(ethylene terephthalate), a poly(1,4-butylene terephthalate), a poly(1,4-cyclohexanedimethylene terephthalate) or a mixture thereof. The preferred coating agent is a bisphenol A epoxide, an epoxy novolac or polyolefin wax. The preferred flame retardant agent is a brominated phthalimide.

Also according to the present invention there is provided a novel method for improving the color of glass reinforced polyesters flame retarded with halogenated bis-imide flame retardants agents, comprising coating the glass reinforcing agent with the coating agents of the present invention.

DETAILED DESCRIPTION OF THE INVENTION

Component (a) of the present invention comprises polyester resins. Polyesters generally for use herein are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units of the following general formula:

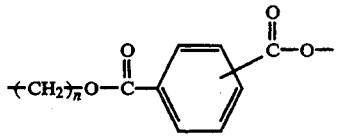

wherein n is an integer of from 2 to 8. The most preferred polyesters are poly(ethylene terephthalate), poly(1,4-butylene terephthalate), poly(1,4-cyclohexanedimethylene terephthalate) and mixtures thereof.

Also contemplated herein are the above polyesters with minor amounts, e.g., from 0.5 to about 5 percent by weight, of units derived from aliphatic acid and/or aliphatic polyols to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans- isomer, or mixtures thereof, of, for example, 1,4-cyclohexanedimethanol with an aromatic dicarboxylic acid so as to produce a polyester having recurring units of the following formula:

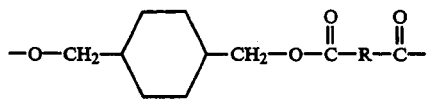

wherein the cyclohexane ring is selected from the cis- and trans- isomers thereof and R represents an aryl radical containing from 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans- isomer, or a mixture thereof, of 1,4-cyclohexanedimethanol with a mixture of isophthalic and terephthalic acids. Such a polyester would have repeating units of the formula:

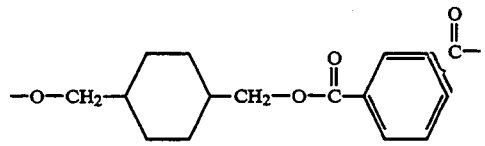

Still another preferred polyester is a copolyester derived from a cyclohexane dimethanol, an alkylene glycol and an aromatic dicarboxylic acid. These copolyesters are prepared by condensing either the cis- or trans-isomer, or mixtures thereof, of, for example, 1,4-cyclohexanedimethanol, and an alkylene glycol with an aromatic dicarboxylic acid so as to produce a copolyester having units of the formula:

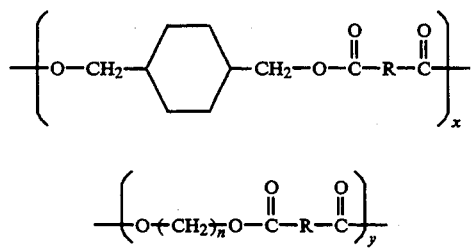

wherein the cyclohexane ring is selected from the cis- and trans- isomers thereof, R is as previously defined, n is an integer of 2 to 8, the x units comprise from about 10 to about 90 percent by weight and the y units comprise from about 90 to about 10 percent by weight.

Such a preferred copolyester may be derived from the reaction of either the cis- or trans- isomer (or mixtures thereof) of 1,4-cyclohexanedimethanol and ethylene glycol with terephthalic acid in a molar ratio of 1:2:3. These copolyesters have repeating units of the following formula:

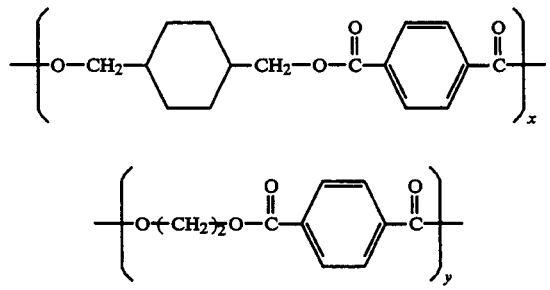

wherein x and y are as previously defined.

The polyesters described herein are either commercially available or can be produced by methods well known in the art, such as those set forth in, for example, U.S. Pat. No. 2,901,466.

The polyesters used herein typically have an intrinsic viscosity of from about 0.4 to about 2.0 dl/g as measured using a 120–130 mg sample of polyester in a 60:40 phenol:tetrachloroethane mixture or similar solvent at 23°–30° C. and measuring the time of flow with a Ubbelohde capillary viscometer.

In other embodiments of the present invention, the polyesters may be blended with a polycarbonate resin.

The polycarbonates useful in the resin blends of the present invention are well known to those skilled in the art and can comprise non-aromatic as well as aromatic forms.

With respect to aromatic polycarbonates, these can be made by those skilled in this art or they can be obtained from a variety of commercial sources. They may be prepared by reacting a dihydric phenol with a carbonate precursor, such as phosgene, a haloformate or carbonate ester. Typically they will have recurring structural units of the formula:

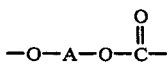

wherein A is a divalent aromatic radical of the dihydric phenol employed in the polymer producing reaction. Preferably, the aromatic carbonate polymers have an intrinsic viscosity ranging from 0.30 to 1.0 dl/g (measured in methylene chloride at 25° C.). By dihydric phenols is meant mononuclear or polynuclear aromatic compounds containing two hydroxy radicals, each of which is attached to a carbon atom of an aromatic nucleus. Typically, dihydric phenols include 2,2-bis(4-hydroxyphenyl)propane; 2,2-bis(3,5-dimethyl-4-hydroxyphenyl)propane; 4,4'-di-hydroxydiphenyl ether; bis(2-hydroxyphenyl)methane, mixtures thereof and the like.

The preferred aromatic carbonate polymer is a homopolymer derived from 2,2-bis(4-hydroxyphenyl)propane or bisphenol-A, which is commercially available under the trade designation LEXAN ® from General Electric Company.

Typically, the blends of the polyester and polycarbonate will contain from about 1 to about 99 parts by weight of polycarbonate and from about 99 to about 1 part by weight of polyester based on 100 parts by weight of the polycarbonate and polyester taken together. In preferred embodiments, the amount of polycarbonate in the blends will range from about 5 to about 95, more preferably from about 20 to about 80, and most preferably from about 40 to about 60 parts by weight based on 100 parts by weight of the polycarbonate and polyester taken together. Correspondingly, the amount of polyester will range from about 95 to about 5, more preferably from about 80 to about 20, and most preferably from about 60 to about 40 parts by weight, same basis.

Further, the polyester-polycarbonate resin blends can be stabilized against ester-carbonate interchange with stabilizers as is known to those skilled in the art. For example, such stabilizers can include inorganic phosphorus reagents. See, Jacquiss et al., U.S. Pat. No. 4,532,290.

The flame retardant agents (b) of the present invention are those comprising a halogenated bis-imide. These materials are known to those skilled in the art and are described in the patent literature, e.g., Sonnenberg, U.S. Pat. No. 4,374,220.

Particularly useful halogenated imides are halogenated bis-imides which are of the general formulae:

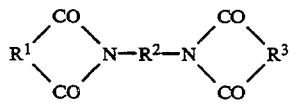

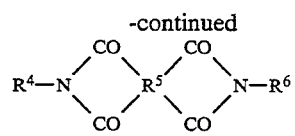

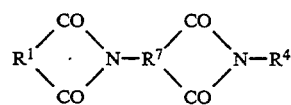

where $R^1$, $R^2$ and $R^3$, which may be the same or different, each independently represents a divalent organic radical, $R^4$ and $R^6$, which may be the same or different, each independently represents a monovalent organic radical, $R^5$ represents a tetravalent organic radical and $R^7$ represents a trivalent organic radical, and wherein $R^1$, $R^2$ and $R^3$ in Formula I, $R^4$, $R^5$ and $R^6$ in Formula II, and $R^1$, $R^7$ and $R^4$ in Formula III taken together contain at least one halogen atom, preferably at least 4 halogen atoms, advantageously chlorine or bromine atoms, preferably bromine. Advantageously, the halogen atoms represent at least 25% by weight of the molecule and preferably, the halogen atoms are bound to aromatic carbon atoms.

The compounds may be substituted or further substituted by halogen atoms, especially by chlorine or bromine atoms, provided that the imides are still formed therefrom. The compounds may also be substituted by other groups, for example, alkyl, aryl, alkaryl or aralkyl radicals, functional groups and hetero atoms provided that the flame retardant properties of the resulting bis-imides are not adversely affected thereby. It will be appreciated that the presence of a substituent group on the radical will not in general affect the flame retardant properties except to the extent that the molecular weight is increased.

As illustrative examples of suitable bis-imides for use in the present invention, there may be mentioned:

N,N'-(p- and m-phenylene)-bis(3,4,5,6-tetrachlorophthalimide);

N,N'-(p- and m-phenylene)-bis(3,4,5,6-tetrabromophthalimide);

N,N'-(methylene-di-p-phenylene)-bis(3,4,5,6-tetrachlorophthalimide);

N,N'-(methylene-di-p-phenylene)-bis(3,4,5,6-tetrabromophthalimide);

N,N'-(oxy-di-p-phenylene)-bis(3,4,5,6-tetrachlorophthalimide);

N,N'-(oxy-di-p-phenylene)-bis(3,4,5,6-tetrabromophthalimide);

N,N'-(p- and m-tetrachloroxylylene)-bis(3,4,5,6-tetrachlorophthalimide);

N,N'-(p- and m-tetrachloroxylylene)-bis(3,4,5,6-tetrabromophthalimide);

N,N'-(p and m-tetrachloroxylylene)-bischloroendimide;

N,N'-(1,2-ethylene)-bischloroendimide;

N,N'-(1,2-ethylene)-bis(3,4,5,6-tetrabromophthalimide;

N,N'-bis(1,2,3,4,5-pentabromobenzyl)pyromellitimide; and

N,N'-bis(2,4,6-tribromophenyl)-pyromellitimide.

Still other halogen-containing bis-imides useful in the practice of the present invention are those of the formulae:

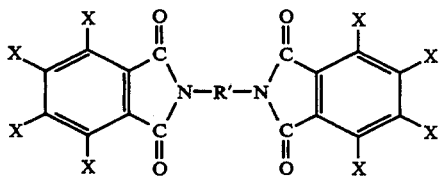

wherein R' represents a divalent organic radical selected from the group consisting of alkylene radicals containing 2 to 19 carbon atoms, and divalent aryl, substituted aryl or aralkyl radicals selected from the group consisting of

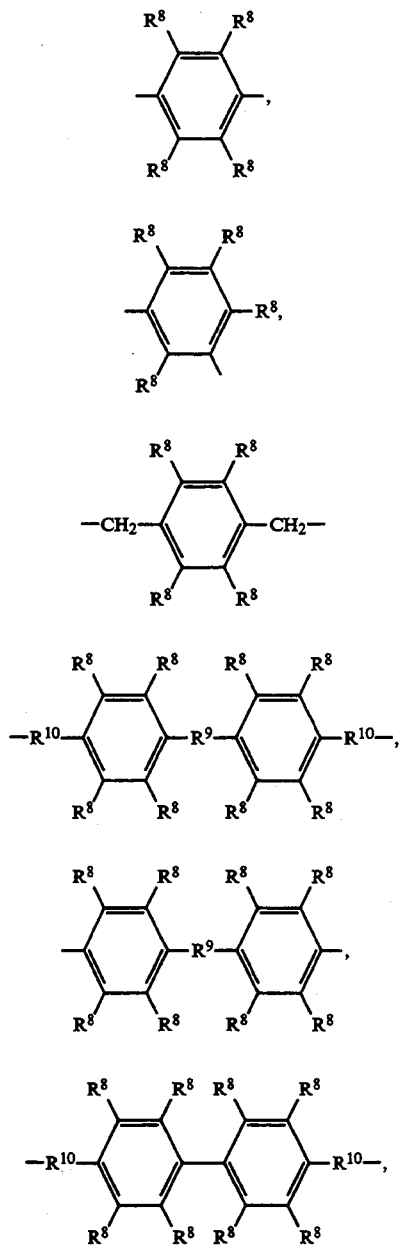

and

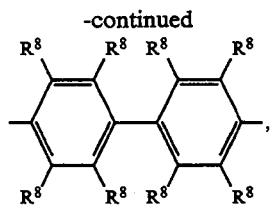

in which each $R^8$, which may the same or different, independently represents a radical selected from the group consisting of hydrogen, an alkyl radical containing from 1 to 4 carbon atoms, bromine and chlorine, $R^9$ represents a radical selected from the group consisting of alkylene radicals, containing from 1 to 4 carbon atoms and hetero atoms and $R^{10}$ represents an alkylene radical containing from 1 to 4 carbons atoms; and wherein each X is independently bromine or hydrogen with the proviso that at least 4 of the X's are bromine.

The bis-imides may be made by any of the methods in general use or described in the literature for the manufacture of imides. In general, the imide results from heating together the corresponding anhydride and amine with elimination of water, the reactants being dissolved in a common solvent. Suitable solvents include for example, N-methyl-pyrrolidone, dimethyl acetamide, xylene and cresol.

Generally, the imide will be precipitated from the solution during the reaction or on cooling after the reaction. If the imide is required pure, the precipitate may be filtered, washed and recrystallized from a suitable solvent.

It is to be understood that all halogen-containing bis-imides are useful in the practice of the present invention including mixtures of different halogenated bis-imides, although the brominated bisimides are preferred. Further, the bis-imides can be combined with materials commonly used or proposed for use as flame retardant synergists. These are well known to those of ordinary skill in the art and are widely available or can be made in known ways. Illustratively, they typically include antimony compounds, such as antimony oxide, antimony phosphate, antimony pentoxide, antimony tetraoxide, and Group IA or IIA antimonates such as sodium antimonate, potassium antimonate and magnesium antimonate, and mixtures of any of the foregoing. Particularly useful in the practice of the present invention is antimony oxide ($Sb_2O_3$).

The filamentous glass to be employed in reinforcing agent (c) in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass. However, other glass compositions are useful in the practice of the present invention, and all such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 3 microns to about 20 microns, but this is not critical to the present invention. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur.

Essential to the present invention is that the glass fibers are coated with a coating agent selected from epoxylated phenolics, epoxylated carboxylic acids, polymers of unsaturated epoxides, epoxidated dienes or polyenes, and mixtures of any of the foregoing. Use of these coatings provides the excellent strand bundle integrity and color reduction characteristics of the present invention.

Examples of these types of surface-coatings include bisphenol A-type epoxy compounds obtained by reacting bisphenol A with epichlorohydrin, hisphenol F-type epoxy compounds obtained by reacting 4,4'-dihydroxydiphenylmethane with epichlorohydrin, poly(alkylene ether glycol diglycidyl ethers) such as polyethylene glycol diglycidyl ether or polypropylene glycol diglycidyl ether, alkylene glycol diglycidyl ethers such as ethylene glycol diglycidyl ether or butanediol-1,4-diglycidyl ether, sorbitol polyglycidyl ether, glycerol polyglycidyl ether, diglycerol polyglycidyl ether, vinyl cyclohexane dioxide, dicyclopentadiene dioxide, 3,4-epoxy-6-methylcyclohexyl-methyl-3,4-epoxy-6-methylcyclohexane carboxylate and novolac-type epoxy compounds derived from a novolac resin and epichlorohydrin or similar compound. These epoxy compounds can be used either alone or in combination with one another. These epoxy coatings are known to those skilled in the art and are described in the patent literature, e.g., Ogawa et al., U.S. Pat. No. 4,276,208 and Watson, U.S. Pat. No. 4,487,797.

In an alternative embodiment of the present invention, it is contemplated to employ polyolefinic compositions as the coating agent. Typically, these comprise polyethylene and polypropylene. A particularly suitable polyolefinic coating agent is polyethylene wax. These coating agents are well known to those skilled in the art and are available commercially.

It is also contemplated by the present invention that the coating agents described above can De employed in admixture with urethane coatings. Preferably, the mixtures will comprise at least 50, more preferably at least 75, weight percent of the epoxy-containing or polyolefin wax coating agents of the present invention, based on the total weight of the coating agent mixture, in order to still obtain the improved color reduction characteristics of the present invention.

The amount of coating agent employed can generally be selected as desired. Typically, the amount ranges from about 0.1 to about 5% by weight, and more typically ranges from about 0.1 to 2% by weight, based on the weight of the glass fibers. The surface coating means can be selected among any known to those skilled in the art. In general, the fibers are coated by immersing the fibers in the coating agent or contacting the fibers with an aqueous emulsion or suspension of the coating.

The glass fiber coating may optionally contain other materials to improve bonding of the coating agents of the present invention to the glass fiber. Functionalized silanes, such as alkoxy silanes, are useful in this regard. Illustrative are aminopropyl triethoxy silane, glycidyl propyl trimethoxy silane, (3,4-epoxycyclohexyl)ethyl triethoxy silane, mercaptopropyl silane, aminoethyl aminopropyl alkoxy silane and ureido-alkyl triethoxy silanes. Particularly useful are aminopropyl triethoxy silane and glycidylpropyl trimethoxy silane.

The glass fiber coating may also contain film forming materials which will stick the individual fibers into bundles to facilitate the handling of the fibers and blending them with the resin prior to melt mixing. These film forming ingredients impart still further improved glass strand integrity on the fibers, i.e., resistance to forming "fuzz balls". Examples of film forming additives are starches, epoxy resins, polyvinyl acetate, unsaturated polyesters, phenoxy resins, polyvinyl ether copolymers and the like. The preferred film formers are those which are stable in water or form stable emulsions, do not cause unfavorable interactions with the thermoplastic polyester, the brominated phthalimide or antimony synergist, are stable under melt processing conditions and give fibers with good integrity.

It is also contemplated herein that the glass fiber coated with the coating agent be annealed. Annealing may be carried out in a conventional annealing oven, as known to those skilled in the art, at temperatures typically ranging from about 200° to about 500° F. for from about 1 to 5 hours.

In general, the best properties will be obtained if the coated filamentous glass reinforcement agent (c) comprises from at least about 1 percent by weight, preferably, from about 1 to about 60 percent by weight, and most preferably from about 25 to about 40 percent by weight based on the total weight of the composition.

The amount of polyester resin component in the compositions of the present invention can vary widely. Preferably the polyester resin component is present in an amount ranging from about 99 to about 40 weight percent and more preferably from about 75 to about 50 weight percent based on the total weight of the composition. Where a blend of poly(ethylene terephthalate) and poly(1,4-butylene terephthalate) is employed, the polyester resin component will comprise from about 1 to about 99 parts by weight poly(ethylene terephthalate) and from about 99 to about 1 part by weight poly(1,4-butylene terephthalate) based on 100 parts by weight of the poly(ethylene terephthalate) and poly(1,4-butylene terephthalate) combined. However, other polyester blends are also contemplated within the scope of the present invention.

The compositions of the present invention can include, in addition to fibrous glass reinforcement of the type described, non-glass reinforcing agents in combination therewith, such as mineral reinforcing fillers, e.g. talc, clay, silica, calcium silicate, mica, and the like. Other ingredients, such as dyes, pigments, colorants, stabilizers, plasticizers, drip retardants and the like can be added for their conventionally employed purposes.

A particularly useful class of stabilizers are the hindered phenol stabilizers. These are generally of the type in which there is a sterically hindered phenolic group, especially one containing a t-butyl group in the ortho position to the phenol OH group. Examples of such compounds are many, and they are well known to those skilled in the art. Illustratively, they include, tetrakis(-methylene-3-(3',5'-di-tert-butyl-4'-hydroxyphenyl)propionate)methane; 1,3,5-trimethyl-2,4,6-tris(3,5-di-tertbutyl-4-hydroxybenzyl)benzene; 4,4'(2,2-phenylpropyl)diphenylamine; esters of ethoxylated aryl phenols; 2,2-thiodiethylbis(3-(3,5-di-tert-butyl-4hydroxyphenyl))propionate; octadecyl-3,5-di-tert-butyl-4-hydroxyhydrocinnamante and mixtures of any of the foregoing. Most preferred is octadecyl-3,5-di-tert-butyl-4-hydroxyhydrocinnamate, which is commercially available as Irganox ® 1076 from Ciba-Geigy Company.

The compositions of the present invention may also comprise a drip retardant agent. These are described in U.S. Pat. No. 3,671,48. Generally, the drip retardant agent comprises a polytetrafluoroethylene resin, which is commercially available or can be prepared by known processes. They are obtained by polymerization of the tetrafluoroethylene in aqueous media with free radical catalysts, e.g., sodium, potassium or ammonium peroxydisulfates at 100 to 1,000 psi and at 0°–200° C. and preferably 20°–100° C. See Brubaker, U.S. Pat. No. 2,393,967.

The compositions of the present invention can be prepared by a number of procedures. In one way, the reinforcing glass fibers are treated with a coating agent of the present invention, e.g., bisphenol A epoxide, to substantially coat the fibers. The coated fibers are combined and then chopped into small pieces, e.g., one-eighth to 2 inches in length. The coated chopped glass fibers, and optionally a mineral filler, are fed into an extrusion compounder with the polyester resin, flame retarding agent and optional other additives, to produce molding pellets. The reinforcing agent is thereby shortened and dispersed in a matrix of the resin coming out less than one-sixteenth of an inch long in the process. In another procedure, glass filaments are ground or milled to short lengths and treated with the coating agents of the present invention. The treated chopped fibers are then mixed with the polyester resin and optional additives by dry blending and then either fluxed on a mill and ground, or they are extruded and chopped. In still another procedure, continuous lengths of glass roving are pretreated with a coating agent of the present invention and then drawn through a bath of melted polyester resin, flame retardant and other additives which thereby substantially coats the filaments and the resin coated treated glass strand is chopped into small cylinders, one-fourth inch or longer, such as 1 to 2 inches to form a molding compound. The treated glass fibers can also be mixed with resin and additives and directly molded, e.g., by injection or transfer molding techniques.

In addition, compounding should be carried out to ensure that the residence time in the machine is short, the temperature is carefully controlled, the friction heat is utilized; and an intimate blend between the resin, flame retardant and reinforcement is obtained.

Although it is not essential, good results are obtained if the components are precompounded, pelletized and molded. Precompounding can be carried out in conventional equipment. For example, after carefully predrying the polyester resin, e.g., under vacuum at 100° C. for about 4 hours, a single screw extruder is fed with a dry blend of the components, the screw employed having a long transition section to ensure proper melting. On the other hand, a twin extrusion machine, e.g., a 30 mm Werner Pfleiderer machine, can be fed with resin, flame retardant and additives at the feed port and the coated glass fiber reinforcing agent downstream.

The precompounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, and conventional mold temperatures.

DESCRIPTION OF THE PREFERRED EMBODIMENTS

The following examples illustrate the present invention. They are not to be construed to limit the claims in any manner whatsoever. All compositional data are in weight percent unless otherwise indicated.

EXAMPLE 1-2

Flame retardant polyester compositions having varying coated glass fibers are prepared by blending the respective ingredients in a 2½ inch single screw extruder at 450°–500° F. 100 rpm. In addition, each of the glasses were also treated with 0.05 to 0.20 percent alkoxy amino silane as well as the indicated sizing agent. The compositions are then molded and tested for change in color by comparison to white tile standard according to the following procedures.

Delta E is the square root of the sum of the squares of the differences in the delta l (light dark), delta b (blue to yellow) and delta a (red to green) values. A higher l value is a darker color, a higher b value is a yellow color and a higher a value is a red color. In these samples, the main spectral change was from blue to yellow. Values were measured using a cool white fluorescent illuminant at a 10° degree angle with spectral values (gloss) included.

YI (Yellowness Index), change in yellowness, was measured using a C illuminant and calculated from the X,Y,Z color values using the following equation:

$$YI = \frac{128X - (106Z)}{Y}$$

The results along with compositional data are set forth below in Table 1.

TABLE 1

| Example | 1A* | 1 | 2 |
|---|---|---|---|
| Composition | | | |
| PBT 295[a] | 60.0 | 60.0 | 60.0 |
| BT-93[b] | 6.0 | 6.0 | 6.0 |
| Sb$_2$O$_3$ | 1.63 | 1.63 | 1.63 |
| EEA[c] | 2.32 | 2.32 | 2.32 |
| Stabilizer[d] | 0.05 | 0.05 | 0.05 |
| Urethane glass[e] | 30.0 | — | — |
| BPA Epoxy glass[f] | — | 30.0 | — |
| Novolac Epoxy glass[g] | — | — | 30.0 |
| Properties | | | |
| Delta E | 24 | 14 | 16 |
| Yellowness Index | 34 | 19 | 22 |

\* = Comparative Example
[a] = VALOX ® 295, polybutylene terephthalate, General Electric Company
[b] = Ethylene diamine bis tetrabromo phthalimide, flame retardant
[c] = Ethylene ethylacrylate copolymer
[d] = Irganox ® 1076 hindered phenol antioxidant
[e] = Urethane (aliphatic isocyanurate polyester) coated glass fiber.
[f] = Bisphenol A epoxy coated glass fiber.
[g] = Novolac epoxy coated glass fiber.

The data in Table 1 above demonstrates the dramatic improvement in discoloration obtained in polyester compositions prepared according to the present invention.

EXAMPLE 3

Various glass fibers are tested for strand integrity, i.e., tendency to fuzz. The glass fibers are placed in a suitable vessel and shaken for 30 seconds with steel balls. The mixture of fibers and fuzz are then separated in sieves. The results are set forth below in Table 2.

TABLE 2

| Glass fiber coating | % by weight Fuzz |
| --- | --- |
| BPA Epoxy | <5 |
| Novolac Epoxy | 23 |
| Polyolefin wax | 5–10 |
| TGIC | 44 |

From the data in Table 2 it can be seen that the BPA epoxy, Novolac epoxy and polyolefin wax provide good strand integrity and can readily be compounded into molding compositions. However, the triglycidyl isocyanurate (TGIC) coating was very fragile, and the fibers coated with this material could not be compounded into molding compositions.

EXAMPLE 4

The procedure of Example 1 is followed employing a blend of poly(butylene terephthalate) and polyethylene terephthalate. The results along with compositional data are set forth below in Table 3.

TABLE 3

| Example | 4A* | 4 |
| --- | --- | --- |
| Composition | | |
| PBT 295[a] | 49.1 | 49.1 |
| PET ICI5202[b] | 3.0 | 3.0 |
| BT-93[c] | 8.7 | 8.7 |
| Sb$_2$O$_3$ | 2.4 | 2.4 |
| EEA[d] | 3.4 | 3.4 |
| Stabilizers and flow aids[e] | 3.4 | 3.4 |
| Epoxy glass[f] | — | 30.0 |
| Urethane Glass[g] | 30.0 | — |
| Results | | |
| Color Change[h] | | |
| Delta E | 13.8 | 9.2 |
| Delta B | 13.6 | 9.2 |

\* = Comparative Example
[a] = VALOX ® 295, polybutylene terephthalate, General Electric Company
[b] = Polyethylene terephthalate, ICI Americas, Co.
[c] = Ethylene diamine bis tetrabromo phthalimide, flame retardant
[d] = Ethylene ethylacrylate copolymer
[e] = 3.0% polytetrafluoroethylene polycarbonate concentrate, 0.2% olefin wax, 0.15% Irganox ® 1076 hindered phenol antioxidant
[f] = bisphenol A epoxy/urethane (85/15) coated glass fiber.
[g] = Urethane (aliphatic isocyanurate polyester) coated glass fiber.
[h] = Measured at 2° angle The data in Table 3 above demonstrates the significant improvement in color change obtained by polyester compositions prepared according to the present invention.

EXAMPLES 5–7

The procedure of Example 1 is followed to provide additional data showing the effect of fiber glass coating on the color of polyester blends that are flame retarded with a brominated phthalimide. The results along with compositional data are set forth in Table 4 below.

TABLE 4

| Example | 5A* | 5 | 6 | 7 |
| --- | --- | --- | --- | --- |
| Composition | | | | |
| PBT 295[a] | 49.1 | 49.1 | 49.1 | 49.1 |
| PET[b] | 3.0 | 3.0 | 3.0 | 3.0 |
| BT93[c] | 8.7 | 8.7 | 8.7 | 8.7 |
| Sb$_2$O$_3$ | 2.4 | 2.4 | 2.4 | 2.4 |
| Stabilizers and flow aids[d] | 3.4 | 3.4 | 3.4 | 3.4 |
| Urethane glass[e] | 30 | — | — | — |
| Epoxy/urethane glass[f] | — | 30 | — | — |
| Epoxy glass[g] | — | — | 30 | — |
| Olefin glass[h] | — | — | — | 30 |
| Color change | | | | |
| Delta B | 13.6 | 9.2 | 6.1 | 6.5 |

\* = Comparative example
[a] = VALOX ® 295, polybutylene terephthalate, General Electric Company
[b] = Polyethylene terephthalate, ICI Americas, Co.
[c] = Ethylene diamine bis tetrabromo phthalimide, flame retardant
[d] = 3.0% polytetrafluoroethylene, 0.2% olefin wax, 0.15% Irganox ® 1076 hindered phenol antioxidant
[e] = Urethane coated glass fiber.
[f] = 85/15 bisphenol A epoxy/urethane coated glass fiber
[g] = bisphenol A epoxy coated glass fiber.
[h] = Olefin wax coated glass fiber.

It can be seen from the data above that glass fibers coated with a polyepoxide or polyolefin type coating give significant reduced color compared to the same blends using polyurethane coated glass fibers. The mixed coating, Example 5, gives good results.

EXAMPLES 8–9

The procedure of Example 1 is followed except there is employed a blend of polyester and polycarbonate. The compositional data and results are set forth below in Table 5.

TABLE 5

| Example | 8A* | 8 | 9A* | 9 |
| --- | --- | --- | --- | --- |
| Composition | | | | |
| PBT 295[a] | 24.35 | 24.35 | 32.45 | 32.45 |
| PC[b] | 26.70 | 26.70 | 18.60 | 18.60 |
| PET[c] | 3.0 | 3.0 | 3.0 | 3.0 |
| BT93[d] | 8.7 | 8.7 | 8.7 | 8.7 |
| Sb$_2$O$_3$ | 2.36 | 2.36 | 2.36 | 2.36 |
| EEA[e] | 3.36 | 3.36 | 3.36 | 3.36 |
| Stabilizers and flow aids[f] | 1.53 | 1.53 | 1.53 | 1.53 |
| Urethane glass[g] | 30 | — | 30 | — |
| Epoxy/urethane glass[h] | — | 30 | — | 30 |
| Color change | | | | |
| Delta E | 15.88 | 12.72 | 15.32 | 12.48 |
| Delta B | 13.69 | 10.39 | 13.66 | 10.36 |

\* = Comparative example
[a] = VALOX ® 295, polybutylene terephthalate, General Electric Company
[b] = Bisphenol A polycarbonate, General Electric Company
[c] = Polyethylene terephthalate, ICI Americas, Co.
[d] = Ethylene diamine bis tetrabromo phthalimide, flame retardant
[e] = Ethylene ethylacrylate copolymer
[f] = 0.6% polytetrafluoroethylene, 0.4% olefin wax, 0.23% Irganox ® 1076 hindered phenol antioxidant, 0.3% sodium dihydrogen phosphate
[g] = Urethane coated glass fiber.
[h] = 85/15 bisphenol A epoxy/urethane coated glass fiber.

It can be seen from Table 5 that reduced color is obtained in polyester/polycarbonate resin blends using th 85/15 epoxy/urethane coated glass over the urethane coated glass.

The above-mentioned patents are hereby incorporated by reference.

Many variations of the present invention will suggest themselves to those skilled in this art in light of the above detailed description. For example, instead of bisphenol A epoxide, other coatings such as an epoxy novolac or bisphenol F epoxide or a polyolefin wax may be employed as the coating agent. The glass fibers may comprise E glass or strong "S" glass or any other known fiberizable glass composition. Additionally, any polyester resin or blends of polyester resins may be used in the present invention. Further, the flame retardant may comprise a mixture of a halogenated bisimide with another halogenated compound such as brominated polycarbonate, brominated polystyrene or brominated acrylates or combinations thereof. It is also contemplated to employ drip retardants such as polytetrafluoroethylene in the compositions of the present invention, as well as numerous other commercial additives. All such obvious modifications are within the full intended scope of the appended claims.

We claim:

1. A thermoplastic resin composition comprising:
   (a) a polyester resin;
   (b) a flame retardant agent comprising a halogenated bis-imide; and
   (c) a reinforcing agent comprising glass fiber coated with (1) an epoxy-containing coating agent selected from epoxylated phenolics, epoxylated carboxylic acids, polymers of unsaturated epoxides, epoxylated dienes or polyenes and mixtures of any of the foregoing, or (2) a polyolefin coating agent.

2. A composition as defined in claim 1 wherein said component (a) polyester resin comprises units of an aliphatic diol, a cycloaliphatic diol, or a mixture of such diols and an aromatic diacid.

3. A composition as defined in claim 2 wherein said component (a) polyester resin comprises poly(1,4-butylene terephthalate), poly(ethylene terephthalate), poly(1,4-cyclohexanedimethyl terephthalate) or a mixture thereof.

4. A composition as defined in claim 3 wherein said component (a) polyester resin comprises poly(1,4-butylene terephthalate).

5. A composition as defined in claim 1 wherein said component (b) flame retardant agent comprises a bisimide of the formula:

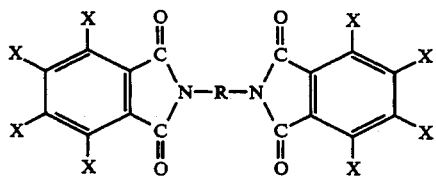

wherein R represents a divalent organic radical selected from the group consisting of alkylene radicals containing 2 to 19 carbon atoms, and divalent aryl, substituted aryl or aralkyl radicals selected from the group consisting of

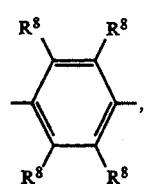

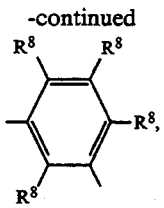

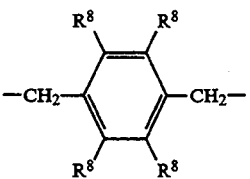

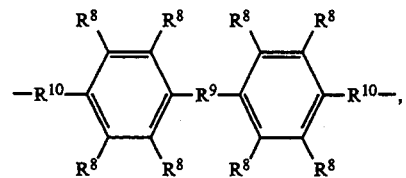

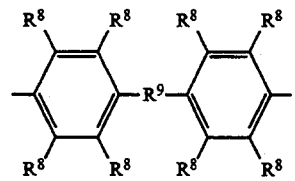

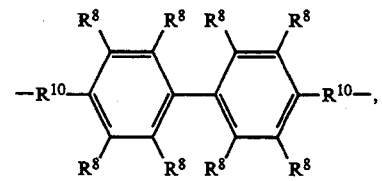

and

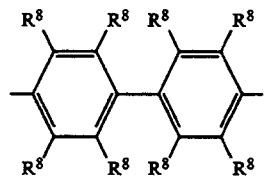

in which each $R^8$, which may the same or different, independently represents a radical selected from the group consisting of hydrogen, an alkyl radical containing from 1 to 4 carbon atoms, bromine and chlorine, $R^9$ represents a radical selected from the group consisting of alkylene radicals, containing from 1 to 4 carbon atoms and hetero atoms, and each $R^{10}$ can be the same or different and independently represents an alkylene radical containing from 1 to 4 carbons atoms; and wherein each X is independently the same or different bromine or hydrogen with the proviso that at least 4 of the X's are bromine.

6. A composition as defined in claim 5 wherein each said X is bromine.

7. A compositions as defined in claim 6 wherein said bisimide comprises N,N'-(ethylene)bis(3,4,5,6-tetrabromophthalimide), N,N'-(p-phenylene)bis(3,4,5,6-tetrabromophthalimide), N,N'-(methylene-di-p-phenylene)-bis-(3,4,5,6-tetrabromophthalimide) or a mixture thereof.

8. A composition as defined in claim 1 wherein said flame retardant agent further comprises an antimony synergist.

9. A composition as defined in claim 8 wherein said antimony synergist comprises antimony trioxide.

10. A composition as defined in claim 1 wherein component (b) is present in an amount ranging from about 10 to about 30 weight percent based on the weight of said polyester resin (a).

11. A composition as defined in claim 1 wherein said component (c) glass fiber reinforcing agent is present in an amount of from about 1 to about 60 weight percent based on the total weight of said composition.

12. A composition as defined in claim 11 wherein said component (c) glass fiber reinforcing agent is present in an amount ranging from about 25 to about 40 weight percent based on the total weight of said composition.

13. A composition as defined in claim 1 wherein said coating agent comprises a polybisphenol A epoxide.

14. A composition as defined in claim 1 wherein said coating agent comprises an epoxy novolac.

15. A composition as defined in claim 1 wherein said coating agent comprises a polyolefin wax.

16. A composition as defined in claim wherein said coating agent comprises at least 50 weight percent of said epoxy-containing coating agent or said polyolefin wax coating agent in admixture with a polyurethane based on the total weight of said coating agent.

17. A composition as defined in claim 1 wherein said coating agent is present in an amount of from about 0.1 to about 2.0 weight percent based on the weight of the component (c).

18. A composition as defined in claim 1 wherein said component (c) glass fiber reinforcing agent is annealed.

19. A compositions as defined in claim 1 wherein said coating agent further comprises a functionalized silane bonding agent.

20. A composition as defined in claim 19 wherein said functionalized silane bonding agent comprises aminopropyl triethoxy silane, glycidyl propyl trimethoxy silane, (3,4-epoxycyclohexyl)ethyl triethoxy silane, mercaptopropyl silane, aminoethyl aminopropyl alkoxy silane, ureido-alkyl triethoxy silanes and mixtures of any of the foregoing.

21. A composition as defined in claim 16 wherein said epoxy-containing coating agent comprises a polybisphenol A epoxide resin.

22. A composition as defined in claim 1 wherein said component (a) polyester resin is present in an amount ranging from about 99 to about 40 weight percent based on the total weight of said composition.

23. A composition as defined in claim 1 wherein said component (a) polyester comprises a blend of a polyester resin and a polycarbonate resin.

24. A composition as defined in claim 23 wherein said polycarbonate resin comprises a poly(bisphenol A)carbonate.

25. A thermoplastic resin composition consisting essentially of:
(a) a polyester resin, optionally in combination with a polycarbonate resin;
(b) a flame retardant agent comprising a halogenated bis-imide, optionally in combination with an antimony synergist; and
(b) a glass fiber reinforcing agent coated with either (1) an epoxy-containing coating agent selected from epoxylated phenolics, epoxylated carboxylic acids, polymers of unsaturated epoxides, epoxylated dienes or polyenes or mixtures of any of the foregoing, or (2) a polyolefin wax coating agent.

26. A method for reducing the discoloration of a glass reinforced polyester resin or polyester/polycarbonate resin blend flame retarded with a halogenated bis-imide comprising employing as the glass reinforcing agent a glass which is coated with either (1) an epoxy-containing coating agent selected from epoxylated phenolics, epoxylated carboxylic acids, polymers of unsaturated epoxides, epoxylated dienes or polyenes or mixtures of any of the foregoing; or (2) a polyolefin wax coating agent.

27. An article having improved color prepared from a thermoplastic resin composition comprising:
(a) a polyester resin, optionally in combination with a polycarbonate resin;
(b) a flame retardant agent comprising a halogenated bis-imide; and
(b) a glass fiber reinforcing agent coated with either (1) an epoxy-containing coating agent selected from epoxylated phenolics, epoxylated carboxylic acids, polymers of unsaturated epoxides, epoxylated dienes or polyenes or mixtures of any of the foregoing; or (2) a polyolefin wax coating agent.

* * * * *